United States Patent

Hoffman

Patent Number: 5,931,481
Date of Patent: Aug. 3, 1999

[54] SNOWMOBILE SKI BRAKE

[76] Inventor: Gregory S Hoffman, 0140 Sam Grange Ct., Carbondale, Colo. 81623

[21] Appl. No.: 08/842,473

[22] Filed: Apr. 23, 1997

[51] Int. Cl.$^6$ ................................. A63C 7/10; B60T 1/14
[52] U.S. Cl. ............................ 280/28.11; 280/605; 188/6
[58] Field of Search ................................. 280/28, 28.11, 280/816, 605; 188/5, 6, 8, 32

[56] References Cited

U.S. PATENT DOCUMENTS

| | | | |
|---|---|---|---|
| 3,909,024 | 9/1975 | Salomon | 280/605 |
| 4,061,296 | 12/1977 | Kubek | 244/112 |
| 4,152,007 | 5/1979 | Smith | 280/605 |
| 4,256,319 | 3/1981 | Winter | 280/18 |
| 4,279,433 | 7/1981 | Petaja | 280/605 |
| 5,509,683 | 4/1996 | Daniel | 280/605 |
| 5,673,772 | 10/1997 | Martin | 188/6 |

*Primary Examiner*—Lanna Mai
*Assistant Examiner*—Bridget Avery

[57] ABSTRACT

A snowmobile braking system providing blades which are downwardly extendible from each side in the central portion of a steering ski controlled by the user by means of an electrically powered pump activating a hydraulic ram which, when desired, rotates the blades downward from the plane of the ski.

1 Claim, 2 Drawing Sheets

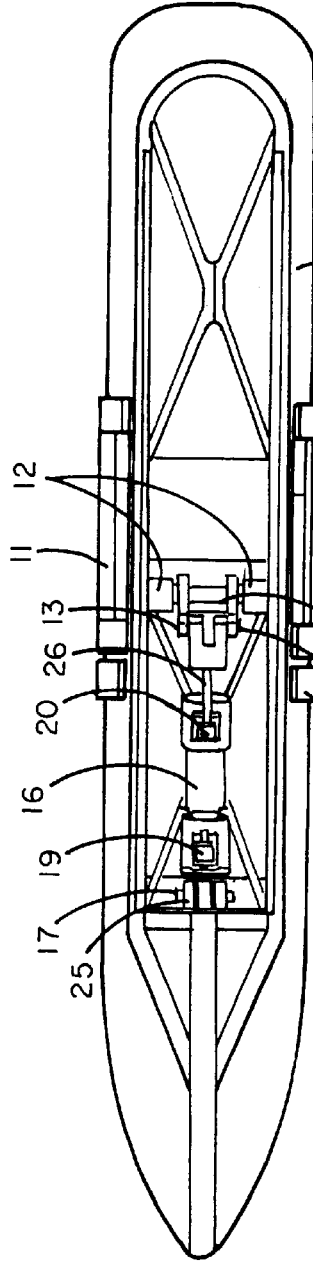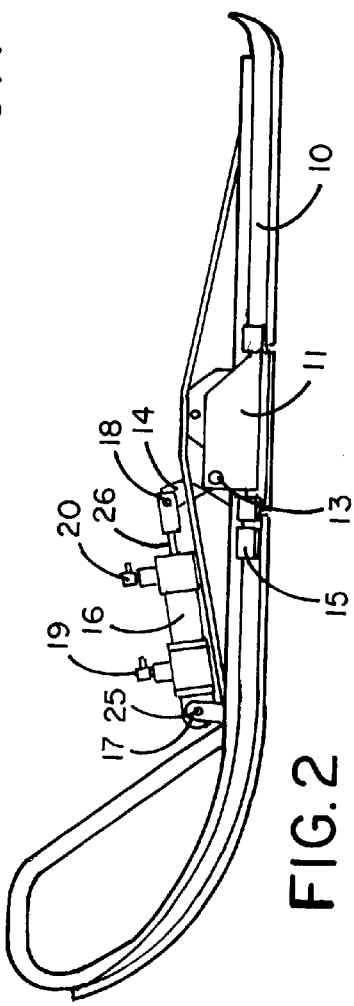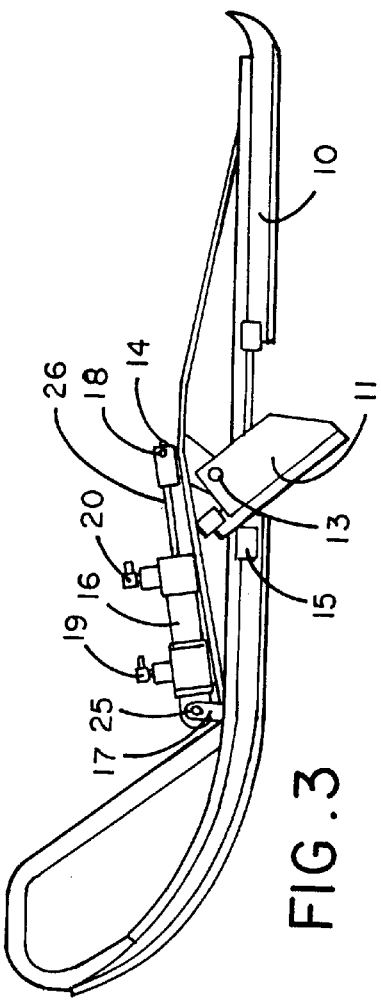

SNOWMOBILE SKI BRAKE

DESCRIPTION OF THE PRIOR ART

A common problem of snowmobiles operating on steep terrain thereon is that when traveling down this terrain the primary braking system of the snowmobile is taxed to the point of failure thus a secondary braking system mounted on the ski of the snowmobile allows for a safer operation of the machine.

Devices for braking sleds, skies, and other devices which travel on snow are known, but none of them solve the problem of aiding the braking system of a snowmobile.

Prior art devices have been developed to solve the problem on aircraft equipped with skies U.S. Pat. No. 4,061,296 to John Kubek which utilizes a hydraulic cylinder connected to the aircraft's original hydraulic system to force a wear plate into the snow to create drag and slow the aircraft down. U.S. Pat. No. 3,104,116 to Knight discloses a rescue toboggan with a mechanically lowered braking device. U.S. Pat. No. 1,617,529 to Kundrat uses a lever to actuate a similar braking device on the back of a sleigh.

SUMMARY OF THE INVENTION

It is an object of the present invention to provide a secondary braking system mounted on the ski of a snowmobile.

It is a further object of this invention to provide a secondary braking system which can be actuated manually at the handlebars of the snowmobile by an electric switch.

A still further object is to provide a braking system which can be applied at different degrees to suit how much braking is required.

In accordance with the principles of this invention there is provided a snowmobile having two skies. One of the skies has two blades mounted to the outer edges of the center of the ski by an axle. The axle is then rotated with attached cam arms which connect to a hydraulic double stage ram. The hydraulic ram is activated by two hoses connected to a electric/hydraulic pump mounted under the hood of the snowmobile. The hydraulic pump is controlled with a double pole double throw electric switch mounted to the handlebars of the snowmobile. When the double pole double throw switch is activated in its first position the hydraulic pump rotates forward applying pressure to the first stage of the ram via the first hose which rotates the cam arms which turn the axle which lowers the blades beneath the ski and into the snow. With the double pole single throw switch released from its first position and activated in its second position the hydraulic pump is reversed thus releasing the pressure on stage one of the ram and applying pressure to stage two via hose number two which in turn retracts the ram, cam arms and blades.

BRIEF DESCRIPTION OF THE DRAWINGS

FIG. 1 illustrates a top view of the ski with the brake installed.

FIG. 2 illustrates a side view of the ski with the brake retracted.

FIG. 3 illustrates a side view of the ski with brake completely engaged.

DESCRIPTION OF THE PREFERRED EMBODIMENT

Figure 4:
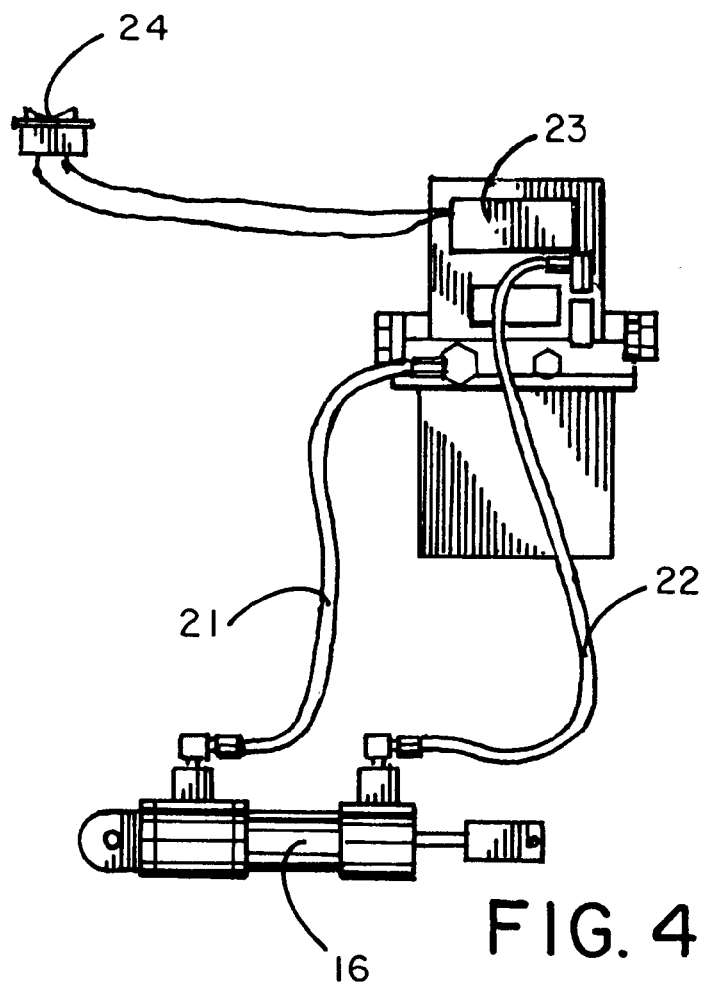
FIG. 4 illustrates the electric/hydraulic pump and ram mechanism with a double pole double throw controlling switch.
Figure 5:
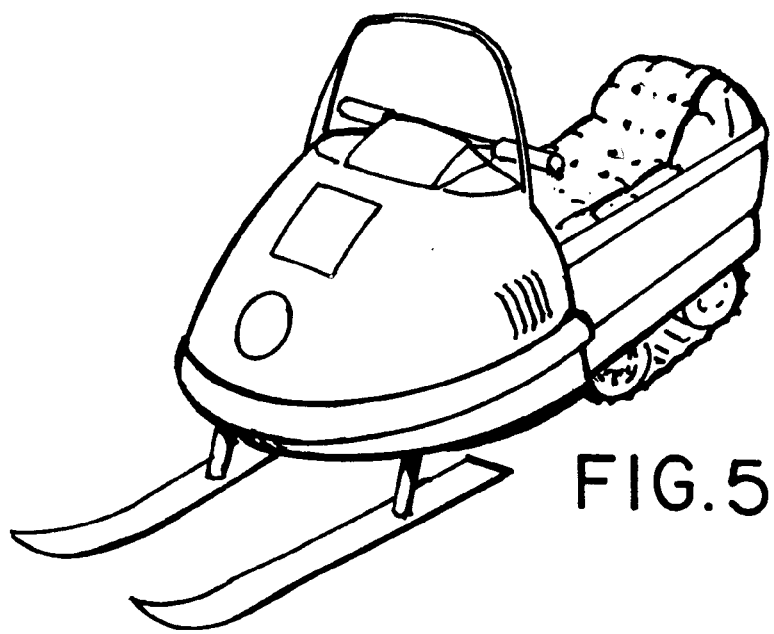
FIG. 5 illustrates a snowmobile.

FIG. 1 illustrates snowmobile ski 10 which is affixed to the snowmobile by way of the spindle (not shown). The ski 10 includes the two blades 11 affixed to the axle 13 which is secured to the ski with two bushings 12. Fastened to the axle 13 is two cam arms 14 which transfers the linear motion of the hydraulic ram 16 to a rotary motion required at the axle 13. The double stage hydraulic ram 16 is fastened to the cam arms 14 by means of a bolt and nut 18. The opposite end of hydraulic ram 16 is attached to the ski by means of a bracket 17 with a bolt and nut 25 securing the two. Deflector 15 is also shown which protects the braking mechanism from fixed objects.

Figure two illustrates a side view of ski 10 with the hydraulic ram 16 retracted consequently blades 11 are retracted also.

Figure three illustrates a side view of ski 10 with the hydraulic ram 16 fully extended thus blades 11 are completely engaged.

Figure four illustrates Hydraulic ram 16 connected to electric/hydraulic pump 23 by way of two hoses 21 and 22. Electric/hydraulic pump 23 is electrically connected to the snowmobile's battery (not shown) and controlled by a double pole double throw electric switch 24.

In operation the snowmobile ski 10 blades 11 are fully retracted thus being in line with the ski creating no friction against the snow as seen in figure two. When the snowmobile requires braking double pole single throw electric switch 24 can be activated in its first position. This action drives the electric/hydraulic pump 23 in a forward rotation which in turns pressurizes hydraulic hose 21 thus pressurizing stage one 19 of the ram 16. Pressurization of stage one 19 on the ram 16 drives the piston 26 away from ram body 16 which in turn propels cam arms 14 towards the center of ski 10 which rotates axle 13. Axle 13 affixed to ski 10 with bushings 12 rotates blades 11, which are permanently attached to axle 13, below the plane of the ski, figure three, which in turn creates drag, from the disruption of the snow, decelerating the snowmobile. When double pole single throw switch 24 is released blades 11 remain, at their most recent position.

When braking is no longer required double pole double throw switch 24 is depressed into its second position which in turn reverses the rotation of electric/hydraulic pump 23. The reverse rotation of electric/hydraulic pump 23 depressurizes hydraulic hose one 21 and pressurizes hydraulic hose two 22. Hydraulic hose two 22 provides pressure to hydraulic ram 16 second stage 20. This action pulls the piston 26 into ram body 16 thus drawing attached cam arms 14 with it. The cam arms 14 rotate the affixed axle away from the center of ski 10 which in turn raises blades 11 from their conflicting position with the snow. Upon release of the double pole double throw switch 24 the blades 11 will remain in their most resent position.

Although the present invention has been described with reference to particular embodiments, it will be apparent to those skilled in the art that variations and modifications can be substituted therefor without departing from the principles and spirit of the invention.

We claim:

1. A braking system for use on a snowmobile on snow, said snowmobile having first and second skis each on a centrally disposed spindle, an electrical power source, a hood and handlebars, each of said skis having a center, a top, a bottom, a length, and first and second outer edges, each ski having a brake, comprising;

first and second bushings disposed at said top of said ski at said center;

a rotatable axle having a first end and a second end, said rotatable axle rotatably retained by said bushings at said center of said ski;

a first blade mounted at said first outer edge of said ski on said first end of said axle, said first blade having a braking mode and a non-braking mode, said first blade disposed in its non-braking mode in line with said bottom of said ski;

a second blade mounted at said second outer edge of said ski on said second end of said axle, said second blade having a braking mode and a non-braking mode, said second blade disposed in its non-braking mode in line with said bottom of said ski;

a hydraulic double-stage ram having an end, a first stage and a second stage, a first inlet and a second inlet, and a forward ram position and a retracted ram position;

a bracket having a first end and a second end, said first end attached to said ski and said second end attached to said end of said ram;

a first cam arm having a first end and a second end, said first end attached to said rotatable axle and said second end attached to said ram;

a second cam arm having a first end and a second end, said first end attached to said rotatable axle and said second end attached to said ram;

an electric/hydraulic reversible pump having a first outlet and a second outlet, said pump mounted under said hood of said snowmobile;

a first hose connecting said first outlet of said pump to said first inlet of said ram;

a second hose connecting said second outlet of said pump to said second inlet of said ram; and a double-pole double-throw electric switch having a first position and a second position, said electric switch mounted on said handlebars and interconnected between said electrical power source and said pump, said switch when in said first position for directing power to said pump for rotating said pump in a forward direction to apply hydraulic pressure to said first stage of said ram through said first outlet through said first hose into said first inlet in said ram to move said ram to its forward position to rotate said first and second cam arms to rotate said axle and attached first and second blades, causing said blades to rotate out of line with said ski and to lower beneath said bottom of said ski to engage into said snow and create drag to decelerate the snowmobile, said switch, when in said second position, reversing said pump which action depressurizes said first hose and pressurizes said second hose and applies hydraulic pressure to said second stage of said ram which action moves said ram to the retracted position and rotates said first and second cam arms which rotate said axle and return said first and second blades to their non-braking position in line with said ski.

* * * * *